United States Patent [19]

Choi et al.

[11] Patent Number: 5,241,037

[45] Date of Patent: Aug. 31, 1993

[54] NADIMIDE-TERMINATED POLYARYLATES AND CURED POLYARYLATE RESINS

[75] Inventors: Kil-Yeong Choi; Mi-Hie Yi, both of Daejeon; Sam-Kwon Choi, Seoul, all of Rep. of Korea

[73] Assignee: Korea Research Institute of Chemical Technology, Daejeon, Rep. of Korea

[21] Appl. No.: 909,319

[22] Filed: Jul. 6, 1992

[30] Foreign Application Priority Data

Oct. 16, 1991 [KR] Rep. of Korea .................. 91-18204

[51] Int. Cl.$^5$ ..................... C08G 63/00; C08G 73/10
[52] U.S. Cl. ................................. 528/185; 528/170; 528/176; 528/182; 528/183; 528/322
[58] Field of Search ............... 528/170, 176, 182, 183, 528/185, 322

[56] References Cited

U.S. PATENT DOCUMENTS

| | | |
|---|---|---|
| 3,133,898 | 5/1964 | Kelk . |
| 3,234,168 | 2/1966 | Hare . |
| 3,317,404 | 5/1967 | Prave et al. ...................... 195/80 |
| 3,553,167 | 1/1971 | Schnell et al. . |
| 3,702,838 | 11/1972 | Wilson . |
| 3,733,306 | 5/1973 | Wolfes et al. . |
| 3,809,679 | 5/1974 | Lenz et al. ...................... 528/185 |
| 3,975,487 | 8/1976 | Cottis et al. ...................... 264/210 F |
| 4,049,629 | 9/1977 | Pawlak et al. . |
| 4,051,107 | 4/1977 | Pawlak et al. . |
| 4,126,602 | 11/1978 | Salee ...................... 160/40 R |
| 4,229,565 | 10/1980 | Gardner et al. ...................... 548/176 |
| 4,745,166 | 5/1988 | Renner et al. ...................... 528/322 |
| 5,116,935 | 5/1992 | Lubowitz et al. ...................... 528/173 |

FOREIGN PATENT DOCUMENTS

| | | |
|---|---|---|
| 49-101944 | 9/1974 | Japan . |
| 51-136793 | 11/1976 | Japan . |
| 53-35796 | 4/1978 | Japan . |
| 55-115871 | 9/1980 | Japan . |
| 56-29684 | 3/1981 | Japan . |
| 2085458 | 4/1982 | United Kingdom . |

OTHER PUBLICATIONS

Serna, Felipe J. et al "Crosslinkable polyester imides" British Polymer Journal, vol. 19 (1987) pp. 453–458.

(List continued on next page.)

Primary Examiner—John Kight, III
Assistant Examiner—T. Mosley
Attorney, Agent, or Firm—Ladas & Parry

[57] ABSTRACT

Nadimide-terminated polyarylate prepolymers having the formula (I)

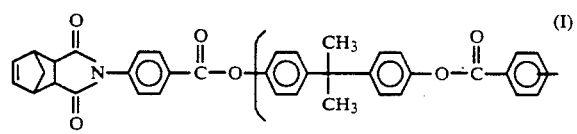

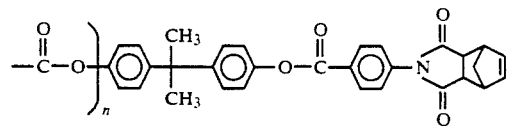

wherein n is an integer not less than 1, and cured polyarylate resins produced by thermal curing the prepolymers, and processes for producing them are disclosed.

The cured polyarylate resins according to the present invention have excellent chemical resistance and high-temperature resistance as well as good mechanical properties and processability.

8 Claims, 1 Drawing Sheet

OTHER PUBLICATIONS

Hong–Bing Tsai, et al "Polyarylates(I): Investigation of the Interfacial Polycondensation Reaction by UV", vol. 25, 1505–1515 (1987) Journal of Polymer Science Part A: Polymer Chemistry, John Wiley & Sons, Inc.

P. Bajaj, et al. "Aromatic–Aliphatic Co–polyesters–I", vol. 15, 1083 European Polymer Journal, Pergamon Press Ltd.

P. Bajaj, et al. "Aromatic–Aliphatic Copolyesters II", vol. 15, 275 European Polymer Journal.

D. N. Khanna et al. "Aromatic–Aliphatic Copolyesters: Structure and Properties" vol. 24, pp. 596–598, Polymer 1983, Butterworth & Co.

Masa–Aki Kakimoto, et al., "Preparation & Properties of Fluorine–Containing Polyarylates from Tetrafluoroisophthaloyl . . . Bisphenols" vol. 25, 2747–2753, Journal of Polymer Sciences Part A: Polymer Chemistry (1987) John Wiley & Sons, Inc.

Kil–Yeoung Choi, et al. "Synthesis & Characterization of Aromatic Polymer Containing Pendant Silyl Groups, I, Polyarylates", vol. 30, pp. 1575–1581, Journal of Polymer Science Part A: Polymer Chemistry, John Wiley & Sons, Inc. 1992.

NADIMIDE-TERMINATED POLYARYLATES AND CURED POLYARYLATE RESINS

BACKGROUND OF THE INVENTION

1. Field of the Invention

The present invention relates to novel polyarylate resins end-capped with nadimide groups and a method for preparing them.

The present invention also relates to novel thermoset type of polyarylate resins having excellent mechanical properties as well as chemical resistance and high-temperature resistance, and a method for preparing them.

2. Description of the Prior Art

Polyarylate resins are, in general, wholly aromatic polyester resins which can be prepared by the polycondensation of aromatic dicarboxylic acid with aromatic diol. The molecular structures of the polyarylate resins vary depending on the monomers employed But typical examples thereof are those represented by the following formula(i)

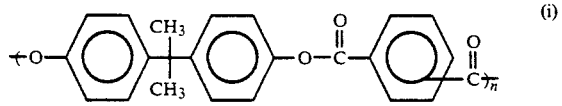

prepared by the polycondensation of bisphenol A as a diol component with terephthalic acid or isophthalic acid as an aromatic dicarboxylic acid component.

The polyarylate resins of the formula(i) are disclosed in Japanese Patent Laid-Open Nos.49-101,944 and 55-115,871. They are transparent and noncrystalline resins which have the following properties:

(1) They have improved high-temperature resistance and excellent mechanical properties without being reinforced by glass fibers owing to high density of aromatic benzene rings in their molecule;

(2) there is a sufficient gap between their softening point and thermal decomposition temperature, so that any of extrusion molding, hollow molding and injection molding may be used;

(3) they have a limiting oxygen index of 37%, so that the resins by themselves possess good flame retardant property;

(4) they have high ultraviolet absorbance to be good in weather-resistance; and (5) they have good compatibility with other resins and thus formulations are easily made, so that the physical properties can be modified in a wide range.

Thus, the polyarylate resins represented by the formula(i) are a sort of specific engineering plastics which have good physical properties. They have been used as a variety of structural and packaging materials for, for example, switches, sockets, microwave ovens, relay cases or substrates in the electric and electronic industries, interior and exterior components of clocks, components of optical instrument, gas cutting apparatus or pump housings in the mechanical industry, and lenses or gauge panels in the auto industry.

Most polyarylate resins presently available in the market are those of the formula(i). The existing resins of the formula(i) have improved high-temperature resistance, but they require a melt processing at a temperature as high as 400° C. due to the high melt viscosity. Such processing at the high temperature leads to poor processability and significant thermal decomposition of the resins, and requires specific process equipments causing higher process cost.

To eliminate the disadvantages of the conventional polyarylate resins, U.S. Pat. No.4,126,602 suggested the use of resins wherein a part of the terephthaloyl chloride and isophthaloyl chloride moieties are replaced by aliphatic dicarboxylic acid and U.K.Patent No.2,085,458 suggested the use of resins wherein dicarboxylic acid having a flexible group such as —O—, —S—, —SO—, —SO$_2$— and —CO— is present between two benzene rings. Further, Japanese Patent Laid-Open Nos. 51-136793 and 56-29684 suggested that, instead of using bisphenol A, biphenols wherein a bond such as —O—, —S—, —SO—, etc. is present between two benzene rings or halogen-substituted or side chain-substituted bisphenol A(or biphenol) are used. The polyarylate resins modified as described above have a decreased melt molding temperature owing to the increased chain flexibility, but their high-temperature resistance, mechanical properties and weather resistance are significantly decreased Therefore the resins are impractical.

Examples of the methods for preparing polyarylate resins generally include the solution polymerization, melt polymerization and interface polymerization methods.

The solution polymerization method comprises converting aromatic dicarboxylic acid to the acid chloride form and then reacting the latter with aromatic diol in the presence of triethylamine or pyridine. For example, terephthalic acid or isophthalic acid are converted to their acid chloride form, i.e., terephthaloyl chloride or isophthaloyl chloride, respectively. This method is classified into "low" and "high" temperature polymerization methods depending on the solvents and the reaction temperatures used. The typical example of the low temperature polymerization method comprises the polycondensation at temperatures of −10° C. to 30° C. using tetrahydrofuran as a solvent as disclosed in U.S. Pat. Nos. 3,234,168; 4,049,629 and 4,051,107. A typical example of the high temperature polymerization comprises polycondensation at elevated temperatures of 215° C. to 220° C. using a higher boiling solvent such as dichloroethylbenzene or ditolylmethane as disclosed in U.S. Pat. No. 3,133,898; 3,702,838 and 3,733,306. However, both methods have disadvantages in that it is difficult to give polymers having high molecular weights and the cost for the solvent recovery and purification is too high to have economical merit on an industrial scale.

The melt polymerization method comprises the polycondensation of a diacetate compound of aromatic diol with aromatic dicarboxylic acid or of a diphenyl ester compound of aromatic dicarboxylic acid with aromatic diol at elevated temperatures of 220° C. to 330° C. in the presence of a catalyst as disclosed in Japanese Patent Laid-Open No. 53-35796, U.S. Pat. Nos. 3,317,464; 3,553,167 and 3,975,487. This polymerization method has problems in that the melt viscosity of the reaction rapidly increases as the polymerization reaction proceeds, and thereby it is difficult to give polymers having high molecular weights. Furthermore, since the polymerization reaction is carried out at a higher temperature, thermal decompositions of the polymers or side reactions may concur with the polymerization reaction causing the polymers to have unsatisfactory color.

Finally, the interface polymerization method comprises dissolving acid chloride of aromatic dicarboxylic acid in an organic solvent which cannot be mixed with water such as dichloromethane and adding a solution of aromatic diol in an aqueous solution of sodium hydroxide into the obtained mixture with violent stirring. If necessary, the phase transfer catalyst such as trimethyl ammonium bromide may be used. See S.C. Temin, "Interfacial Synthesis" ed. F. Mellich and C.E. Carraher, Dekker, New York, 1977, Vol. II, p27; H.-B. Tsai and Y.-D. Lee, J. Polym. Sci., Polym. Chem. Ed. 1987, 25, 1505; U.S. Pat. No. 4,229,565. This polymerization method is advantageous in that the polymerization is carried out even at room temperature, the purity of the raw materials does not matter and the equivalent ratio between the reactants is not necessarily required.

The active researches have been devoted to improving the processability of polyarylate resins since the 1980's. The typical examples thereof are directed to introducing flexible groups into the main chains of polyarylate resins as reported in P. Bajaj, D.N. Khanna and G.N. Babu, Eur. Polym. J., 15, 1083(1979), P. Bajaj and D.N. Khanna, Eur. Polym. J., 17, 275(1981), D.N. Khanna, P. Bajaj and A.K. Gupta, Polymer, 24,596(1983) and to preparing polyarylate resins wherein t-butyl side chains are present as reported in M.-A. Kakimoto, S. Harada, Y. Oishi, Y. Imai, J. Polym. Sci., Polym. Chem. Ed., 25, 2747(1987). But the above methods result in the deterioration of physical properties of polyarylate resins, although solubility and oxidation resistance of the obtained resins are improved.

Further, recent researches made by the present inventors have provided new polyarylate resins where silicon-containing side chains are introduced and which have a good balance of high-temperature resistance and physical properties[See Kil-Yeong Choi, Mi Hie Yi and Sam-Kwon Choi, J. Polym. Sci., Polym. Chem. Ed., in press].

In addition, the assiduous studies have been made for years to improve processability and chemical resistance of polyarylate resins without significant deterioration of their physical properties and high-temperature resistance. As results of these studies, certain high-temperature resistant polymers having new structures have been produced. One of the approaches is to synthesize such polymers as polyetheretherketone or sulfone block copolymer with improved chemical resistance by providing crystallinity on the main chain of the polymer. Another approach is to synthesize heat-resistant polymers with good chemical resistance by introducing curable, unsaturated reactive groups such as a maleimide group of the formula(ii), cyanato group of the formula(iii), nadimide group of the formula(iv) or acetylene group of the formula(v) into the ends of thermoplastic resinous oligomers.

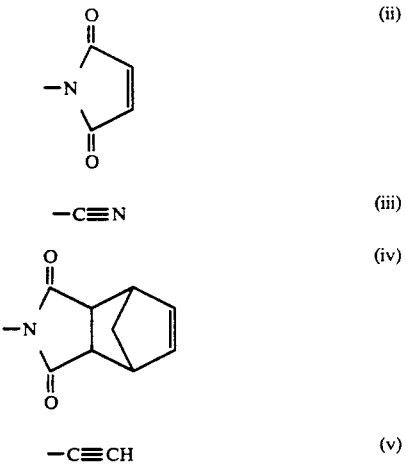

As a typical example thereof, C.H. Sheppard(1980) has proposed the method of end-capping polysulfone(MW=20000)(which is one of the thermoplastic resins) with nadimide groups followed by thermal curing to give the end-capped polysulfone of the formula(vi) with good chemical resistance.

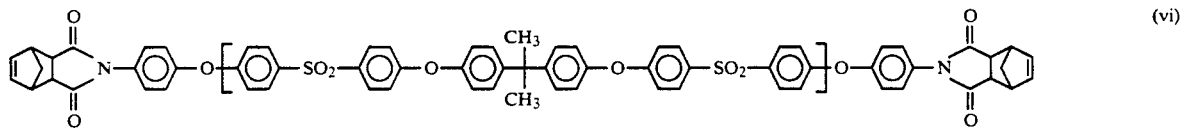

Furthermore, the synthesis and physical properties of acetylene-terminated polysulfones(ATS) of the formula(vii) were studied and reported by P.M. Hergenrother of NASA(1984).

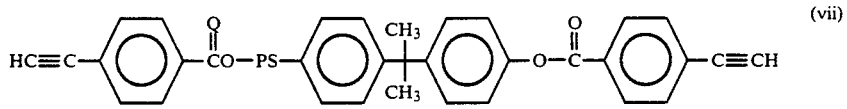

wherein

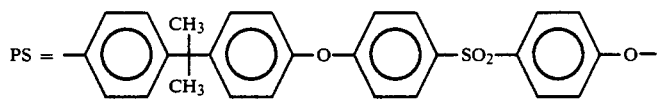

However, the above-described studies have been devoted to some thermoplastic resins such as polyethersulfone, polysulfone, etc., and little attention was given to the end-capped polyarylate resins except for the research made by P.M. Hergenrother. And the research for the end-capping reaction and curing mechanisms of various oligoester were reported only recently by J.DE Abajo.

Based on the result of the above-mentioned studies, the present inventors have made extensive studies using as a basic resin a polyarylate resin which is one of the engineering plastics in order to improve processability and chemical resistance, said properties having caused many problems in conventional polyarylate resins. As a result, the present inventors have now found that by introducing nadimide groups into conventional polyarylate resins and then curing them thermally, heat-resistant, cured polyarylate resins can be produced which are intended for use as structural materials at high temperatures in, for example, auto, electric and electronic, aerospace industries. Based on these findings, we have completed the present invention.

SUMMARY OF THE INVENTION

Figure 1:
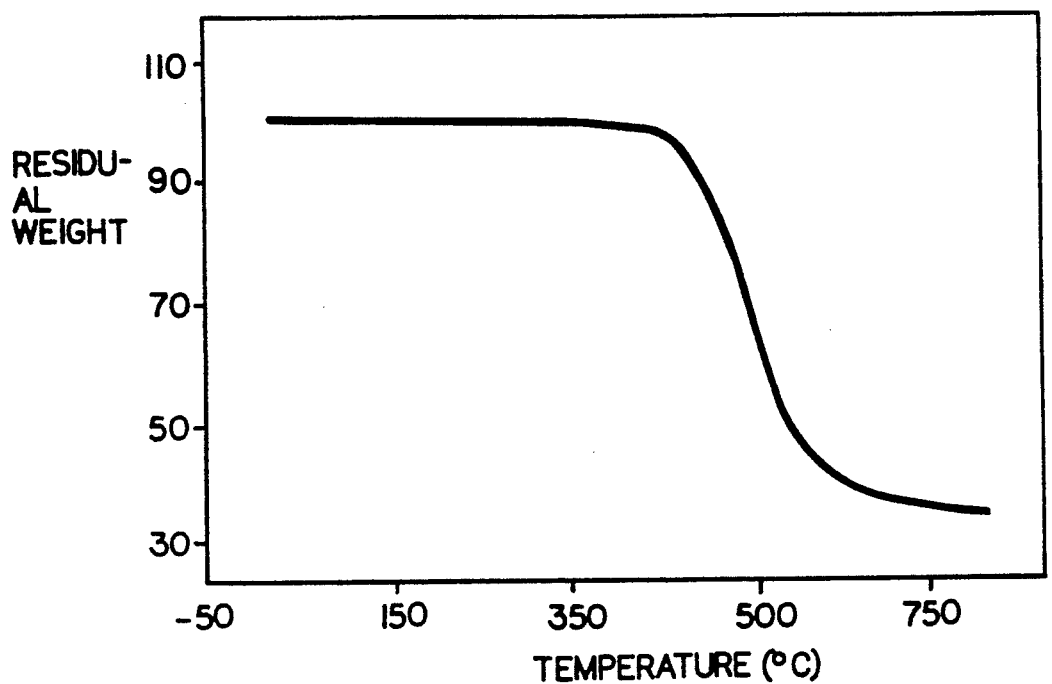
FIG. 1 shows a TGA curve of the cured polyarylate resin(P-III-a)

It is an object of the present invention to provide nadimide-terminated polyarylate prepolymers represented by the formula(I)

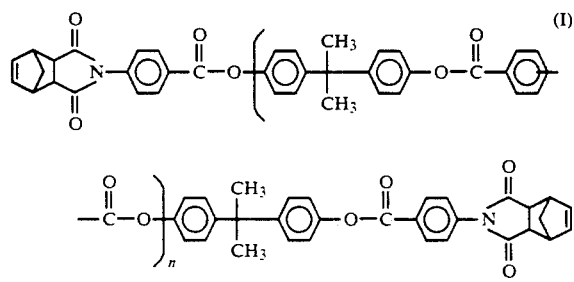

wherein n is an integer of at least 1.

It is a further object of the present invention to provide cured polyarylate resins in the new form which have excellent chemical resistance and high-temperature resistance as well as improved mechanical properties and processability.

It is a further object of the present invention to provide a method for producing the prepolymers of the formula(I) by end-capping conventional polyarylate resins with nadimide groups.

It is a further object of the present invention to provide a method for producing the cured polyarylate resins by curing the nadimide-terminated prepolymers of the formula(I) under the suitable curing conditions.

Other objects and advantages will be apparent to those of ordinary skill in the art from the following descriptions and drawings.

DETAILED DESCRIPTION OF THE INVENTION

The present invention relates to nadimide-terminated polyarylates and cured polyarylate resins.

The nadimide-terminated polyarylate(hereinafter referred to as NTPA) prepolymers can be produced by the conventional solution polycondensation of hydroxy-terminated polyarylate(hereinafter referred to as HTPA) prepolymers of various molecular weights and then by reacting HTPA with 4-nadimido benzoyl chloride.

The cured polyarylate resins in the new form can be produced by curing the prepolymers prepared as described above at temperatures of 290° C. to 300° C. for 3 to 5 hours at 250 psi.

The above-described reactions are summarized in the following reaction scheme (1):

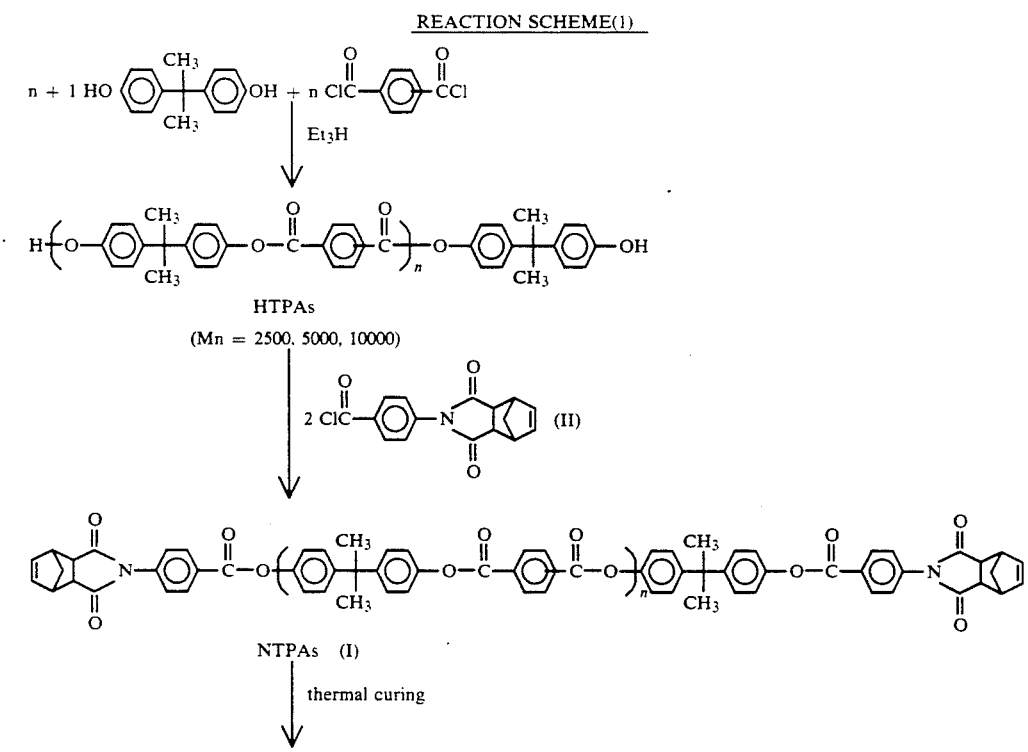

-continued
REACTION SCHEME(1)

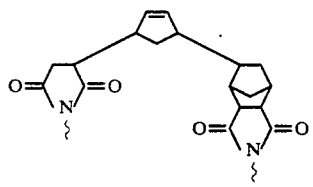

wherein n is an integer not less than 1.

The end-capping group for the end-capped polyarylate resins according to the present invention is 4-nadimido benzoyl chloride(hereinafter referred to as 4-NBC) represented by the formula(II)

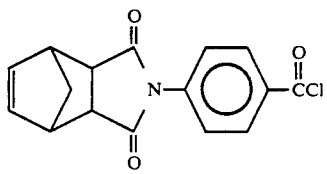
(II)

4-NBC can be reacted with HTPA prepolymers of various molecular weights which have been previously synthesized and then the obtained prepolymers can be subjected to thermal curing under the suitable conditions to give a new form of cured polyarylate resins. The condensation reaction between 4-NBC and HTPA is carried out at temperatures of 10° C. to 30° C. in the presence of triethylamine as an acid acceptor.

4-NBC for use as the end-capping agent in the above condensation reaction can be prepared by the 3-step reaction as shown in the following reaction scheme(2):

REACTION SCHEME(2)

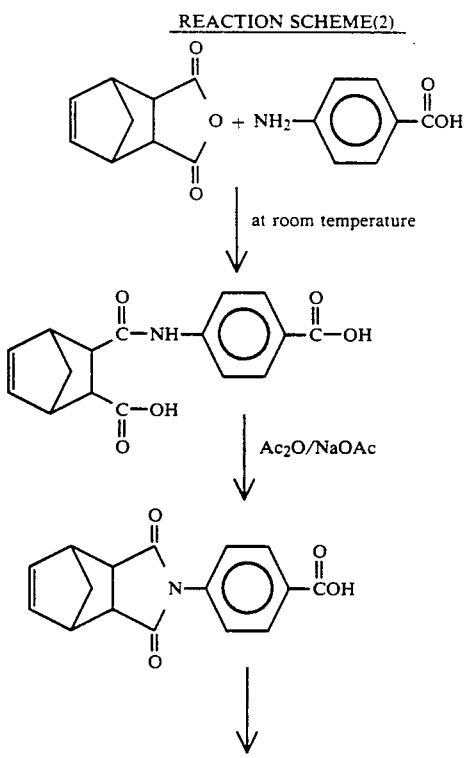

-continued
REACTION SCHEME(2)

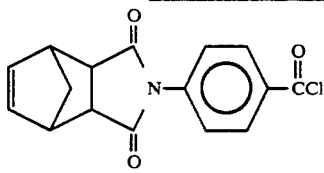

The procedure for preparing 4-NBC is as follows: According to the method of B.S. Rao, et al., nadic anhydride is reacted with p-aminobenzoic acid at room temperature to give a intermediate amic acid derivative, which is then reacted with acetic anhydride in the presence of sodium acetate to carry out chemical imidation. The resulting 4-nadimido benzoic acid(hereinafter referred to as 4-NBA) is chlorinated with thionyl chloride according to the method of J.DE. Abajo to give 4-NBC.

4-NBC prepared as described above is reacted with HTPAs having various molecular weights to give polyarylate prepolymers end-capped with nadimide groups, and then the resulting prepolymers are subjected to thermal curing under pressure to produce a new form of cured polyarylate resins.

The cured polyarylate resins according to the present invention prepared as described above have such good chemical resistance as insolubility in common organic solvents, for example, chloroform, pyridine and even in conc. sulfuric acid at room temperature.

In addition, the cured polyarylate resins according to the present invention have excellent high-temperature resistance. That is, the glass transition temperatures of the cured polyarylate resins are in a range of 203 ° C. to 207 ° C., which are 13° to 17° C. higher than those of the conventional polyarylate resins.

Further, the cured polyarylate resins have quite improved mechanical properties and flame retardance as well as moldability and processability.

Now, the present invention will be described more specifically with reference to examples hereafter, however it should be noted that the present invention is not intended to be restricted within those specific examples.

PREPARATION EXAMPLE 1. Synthesis of 4-NBA

Nadic anhydride was slowly added to a solution of 27.4 g(0.2 mole) of p-aminobenzoic acid in 150 ml of freshly distilled dimethylformaldehyde over a period of 15 minutes and then the solution was stirred under a nitrogen atmosphere for one hour. To the solution were added 2.5 g of sodium acetate and 50 ml of acetic anhydride for 2 hours at 45° C. to carry out imidization of the amic acid derivative. The resulting solution was precipitated in an excess amount of water. This gave crude pale yellow 4-NBA which was then recrystallized from ethanol/water mixed solvent(3/1, by v/v) to give 42.8 g of pure 4-NBA as a white powder. Yield: 73.7%, m.p. 230.5° C.

PREPARATION EXAMPLE 2. Synthesis of 4-NBC 42.45 g(0.15 mole) of 4-NBA was added to a mixture of 90 ml of freshly distilled thionyl chloride and 340 ml of toluene and the mixture was reacted using 0.68 ml of dimethylformaldehyde as a catalyst for 24 hours at 40° C. The excess amount of thionyl chloride and toluene were removed by distillation, the residual solid was dissolved in distilled chloroform and then the undissolved residue was removed by filtration. The resulting product was washed several times with n-hexane and then dried in vacuo at 30° C. to 40° C. to give 42.0 g of pale pink 4-NBC. Yield: 92.9%, m.p. 147.2° C.

EXAMPLE 1

18 ml of distilled ethanol-free chloroform, 2.28 g(0.01 mole) of bisphenol A and 10% excess of triethylamine were charged into a 1 liter reactor equipped with a stirrer, temperature regulator, nitrogen inlet, dropping funnel and condenser, and then the mixture was slowly stirred To this reactor was added a solution of 0.87 g(4.3 mmol) of isophthaloyl chloride and 0.87 g(4.3 mmol)of terephthaloyl chloride in 15 ml of distilled chloroform while the internal temperature of the reactor was maintained at 10° C., and the solution was subjected to solution polymerization over a period of 3 hours. After completing the polymerization reaction, chloroform was distilled off, and the reaction mixture was poured into an excess amount of acetone to precipitate the polymer. The precipitated polymer was separated by filtration, washed several times with water and methanol, and then dried in a vacuum drier at 80° C. for 12 hours to give 3.12 g of the polymer(P-I-a) as a white powder.

The yield was 92.0%, the intrinsic viscosity as measured on a solution of phenol/tetrachloroethane(6/4, by w/w) at a concentration of 0.5 g/dL at 30° C. was 0.23 dL/g and the number average molecular weight as measured by gel permeation chromatography(GPC) was 2393 g/mol.

5.0 g of the obtained prepolymer(P-I-a) was thoroughly dissolved in 45 ml of ethanol-free chloroform and 50% excess of triethylamine was added to the solution and then nitrogen gas was slowly introduced. To this mixture was added 50 ml of a solution of 1.89 g(6.3 mmol, 50% excess) of 4-NBC in chloroform. The subsequent isolation steps were carried out by substantially the same manners as those of HTPA prepolymer(P-I-a) excepting that the reaction mixture was washed several times with hot methanol in order to thoroughly remove the unreacted 4-NBC(or NBA) and dried in a vacuum dryer at 80° C. for 12 hours to give 5.3 g of light brown polymer(P-II-a).

The yield was 78.7% and the intrinsic viscosity as measured on a solution of phenol/tetrachloroethane(6/4, by w/w) at a concentration of 0.5 g/dL at 30° C. was 0.23 dL/g.

The structures of the obtained prepolymers P-I-a and P-II-a were identified by NMR and IR spectroscopy and the results are summarized in Table 3.

The nadimide-terminated polyarylate prepolymer(P-II-a) prepared as described above was subjected to thermal curing in a high pressure reactor at 290° C. under 250 psi for 3 hours to give a cured polyarylate resin(P-I-c) which was clear and pale brown.

EXAMPLE 2

The procedure of Example 1 was repeated excepting that 17 ml of a solution of isophthaloyl chloride(0.94 g, 4.6 mmol) and terephthaloyl chloride(0.94 g, 4.7 mmol) in chloroform was added dropwise to the solution of bisphenol A in chloroform during the solution polymerization step to give 3.46 g (yield: 99.5%) of polyarylate prepolymer(P-I-b) having a number average molecular of 4750 g/mol and an intrinsic viscosity of 0.33 dL/g as measured on a solution of phenol/tetrachloroethane(6/4, by w/w) at a concentration of 0.5 g/dL at 30° C.

5g of the obtained P-I-b was reacted with 0.95 g(3.16 mmol) of 4-NBC to give 5.03 g of polymer(P-II-b) as a light gray powder. The yield was 85.6% and the intrinsic viscosity as measured on a solution of phenol/tetrachloroethane(6/4, by w/w) at a concentration of 0.5 g/dL at 30° C. was 0.32 dL/g.

The curing of P-II-b was carried out under the same conditions as those employed in Example 1. This gave a cured P-III-b which was transparent, pale brown polyarylate resin. The results are summarized in Table 3.

EXAMPLE 3

The procedure of Example 1 was repeated excepting that 17 ml of a solution of isophthaloyl chloride(0.98 g, 4.83 mmol) and terephthaloyl chloride(0.98 g, 4.83 mmol) in chloroform was added dropwise to 18 ml of the solution of bisphenol A in chloroform to give 3.5 g of polyarylate prepolymer(P-I-c) having a number average molecular weight of 9898 g/mol. The yield was 99.0% and the intrinsic viscosity as measured on a solution of phenol/tetrachloroethane(6/4, by w/w) at a concentration of 0.5 g/dL at 30° C. was 0.46 dL/g.

5 g of the obtained P-I-c was reacted with 0.46g(1.51 mmol) of 4-NBC under the same condition as Example 1 to give a polymer(P-II-c) in the form of a light brown powder. The yield was 86.2% and the intrinsic viscosity as measured on a solution of phenol- /tetrachloroethane(6/4, by w/w) at a concentration of 0.5 g/dL at 30° C. was 0.44 dL/g.

The curing of P-II-c was carried out under the same conditions as those used in Example 1. This gave a cured polyarylate resin(P-III-c). The results are summarized in Table 3.

COMPARATIVE EXAMPLE 1

A solution of terephthaloyl chloride(5.08 g, 0.025 mole) and isophthaloyl chloride(5.07 g, 0.025 mole) in dichloromethane was added dropwise to an aqueous alkaline solution of 11.4 g(0.05 mole) of bisphenol A and the mixture was stirred at 10° C. for 1 hour to give a polyarylate resin(PAR-TI).

The yield was 98.0% and the intrinsic viscosity as measured on a solution of phenol/tetrachloroethane(6/4, by w/w) at a concentration of 0.5 g/dL at 30° C. was 0.70 dL/g.

TABLE 1

| Solubility of polyarylates prepared in Examples in chloroform | | | |
|---|---|---|---|
| Ex. No. | Polymer | Solubility | Film Properties |
| 1 | P-I-a | ◯ | brittle |
| 2 | P-I-b | ◯ | brittle |
| 3 | P-I-c | ◯ | tough |
| 1 | P-II-a | ◯ | brittle |
| 2 | P-II-b | ◯ | brittle |

TABLE 1-continued

Solubility of polyarylates prepared in Examples in chloroform

| | Polymer | Solubility | Film Properties |
|---|---|---|---|
| 3 | P-II-c | ○ | tough |
| 1 | P-III-a | X | rigid and tough |
| 2 | P-III-b | X | rigid and tough |
| 3 | P-III-c | X | tough |
| Comp. Ex. 1 | P-TI | ○ | tough |

*○: soluble
X: insoluble

As seen from Table 1, while the uncured polyarylate prepolymers such as P-I-a,b,c and P-II-a,b,c were readily soluble in chloroform in the same manner as the conventional polyarylates, the cured polyarylate resins such as P-III-a,b,c were insoluble under the same condition. That is, their chemical resistance was greatly increased. Furthermore, while the films of the uncured polyarylate resins where the prepolymers have low molecular weights as in case of P-I-a,b and P-II-a,b showed high brittleness, the cured polyarylate resins showed excellent toughness regardless of the molecular weights of the prepolymers.

TABLE 2

Swelling Behavior of Polyarylates in Solvents

| Ex. No. | Polymer | chloroform | sulfric acid | m-cresol | THF | pyridine |
|---|---|---|---|---|---|---|
| 1 | P-I-c | X | X | X | X | X |
| 2 | P-II-c | Δ | X | X | Δ | Δ |
| 3 | P-III-c | ○ | Δ | X | Δ | Δ |

*○: swelling
Δ: slightly swelling
X: not swelling

As seen from Table 2, the cured polyarylate resins according to the present invention are insoluble in chloroform as well as mcresol, pyridine and even in conc. sulfuric acid and show only a low degree of swelling with the increase in molecular weights of polyarylate prepolymers. Therefore, it is expected that the cured polyarylate resins according to the present invention can be used extensively in many application including the auto and aerospace applications which highly desire excellent chemical resistance.

Table 3 below shows the experimental results of a thermal analysis and molecular weights of the polyarylate resins prepared in Examples.

TABLE 3

Thermal Properties of Polyarylates

| | Polymer | Yield (%) | Intrinsic viscosity (dL/g) | Molecular weight (M̄n) (g/mol) | Tg (°C.) |
|---|---|---|---|---|---|
| Ex. No. | | | | | |
| 1 | P-I-a | 92.0 | 0.23 | 2393 | 152 |
| 2 | P-I-b | 99.5 | 0.33 | 4750 | 162 |
| 3 | P-I-c | 99.0 | 0.46 | 9898 | 185 |
| 1 | P-II-a | 78.7 | 0.23 | — | 165 |
| 2 | P-II-b | 85.6 | 0.32 | — | 174 |
| 3 | P-II-c | 86.2 | 0.44 | — | 190 |
| 1 | P-III-a | — | — | — | 203 |
| 2 | P-III-b | — | — | — | 203 |
| 3 | P-III-c | — | — | — | 207 |
| Comp. Ex. 1 | P-TI | 98.0 | 0.70 | 60,000 | 190 |

As seen from Table 3, the cured polyarylate resins have glass transition temperatures of 203° to 207° C. and no weight loss can be observed even when heated to a temperature of approximately 350° C. (FIG. 1).

The cured polyarylate resins according to the present invention have glass transition temperatures which are 13° to 17° C. higher than those of the conventional polyarylate resins, thereby their high-temperature resistance can be greatly increased.

Figure 2:
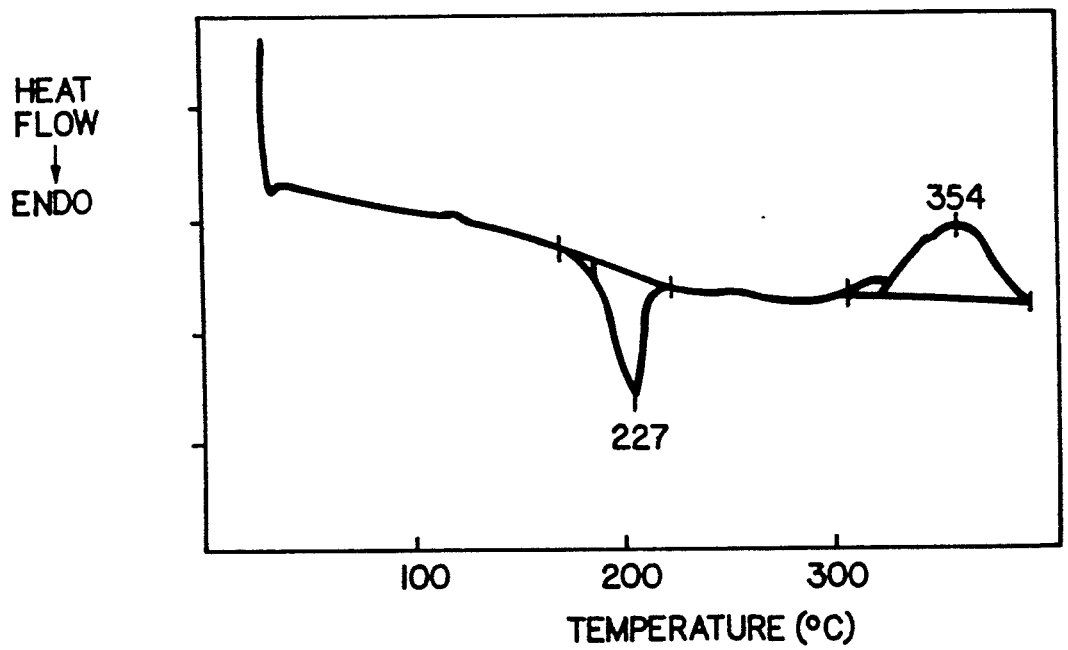
FIG. 2 shows a DSC curve of the polyarylate resin end-capped with nadimide groups(P-II-a).

The nadimide-terminated polyarylate prepolymers according to the present invention have a melting point of approximately 200° C. which is much lower than that of conventional polyarylate resins and have a wide processing window more than 100° C. (FIG. 2), thereby the processability of the conventional polyarylate resins can be considerably enhanced.

What is claimed is:

1. A polyarylate resin represented by the formula (I)

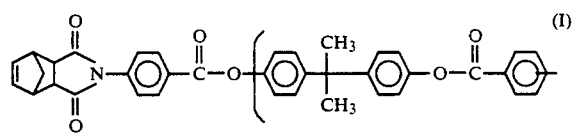
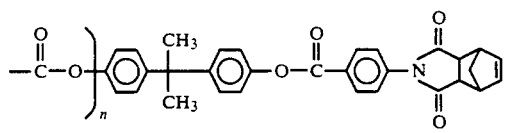

wherein n is an integer not less than 1.

2. A polyarylate resin according to claim 1 having an intrinsic viscosity of 0.1 to 0.5 dL/g as measured on a solution of phenol/tetrachloroethane at a concentration of 0.5 g/dl at 30° C.

3. A polyarylate resin according to claim 1 having a melting point of 200° to 250° C.

4. A cured polyarylate resin which is produced by thermal curing a polyarylate resin defined in claim 1.

5. A cured polyarylate resin according to claim 4 having a glass transition temperature of 200° to 230° C.

6. A cured polyarylate resin according to claim 4 which is substantially insoluble in an organic solvent such as chloroform, m-cresol, pyridine and conc. sulfuric acid at room temperature.

7. A process for producing a cured polyarylate resin according to claim 4 which comprises curing a polyarylate resin represented by the formula (I) at temperatures of 290° to 300° C. under a pressure of 250 psi for 3 to 5 hours.

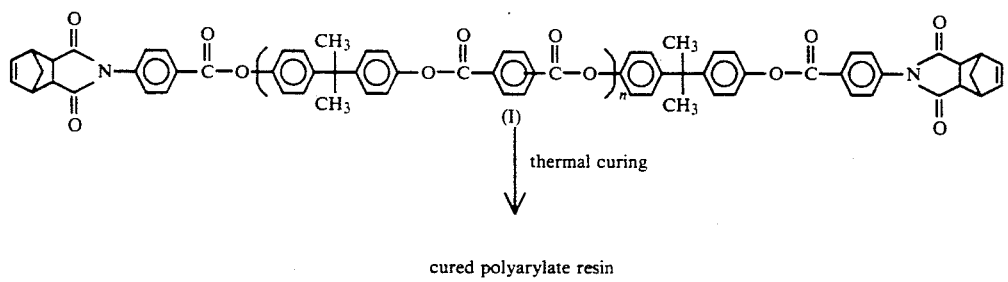

cured polyarylate resin wherein n is an integer not less than 1.

8. A process for producing a polyarylate resin represented by the formula (I)

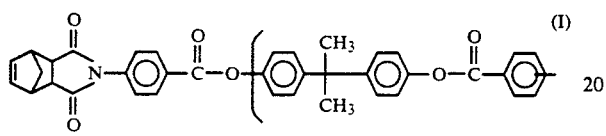

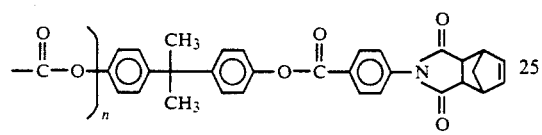

wherein n is an integer not less than 1, said process comprising charging a reactor with reactants comprising bisphenol A, isophthaloyl chloride, terephthaloyl chloride and a solvent under conditions suitable to cause the reactants to react to form a hydroxy-terminated polyarylate prepolymer, separating the thus formed prepolymer and mixing the same in solution with 4-nadimido benzoyl chloride represented by formula II

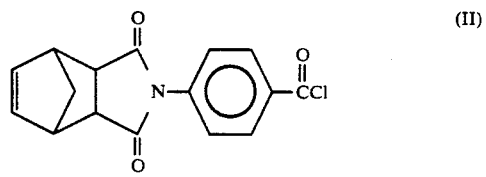

under suitable reaction conditions to form said polyarylate resin represented by formula I.

* * * * *